(12) United States Patent
Jeong et al.

(10) Patent No.: US 9,465,900 B2
(45) Date of Patent: Oct. 11, 2016

(54) SYSTEM AND METHOD FOR DESIGNING SEMICONDUCTOR PACKAGE USING COMPUTING SYSTEM, APPARATUS FOR FABRICATING SEMICONDUCTOR PACKAGE INCLUDING THE SYSTEM, AND SEMICONDUCTOR PACKAGE DESIGNED BY THE METHOD

(71) Applicants: Jae-Hoon Jeong, Hwaseong-si (KR); Won-Cheol Lee, Seoul (KR); Young-Hoe Cheon, Suwon-si (KR); Bo-Sun Hwang, Yongin-si (KR); Chan-Seok Hwang, Seongnam-si (KR)

(72) Inventors: Jae-Hoon Jeong, Hwaseong-si (KR); Won-Cheol Lee, Seoul (KR); Young-Hoe Cheon, Suwon-si (KR); Bo-Sun Hwang, Yongin-si (KR); Chan-Seok Hwang, Seongnam-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 399 days.

(21) Appl. No.: 14/064,102

(22) Filed: Oct. 25, 2013

(65) Prior Publication Data
US 2014/0131867 A1   May 15, 2014

(30) Foreign Application Priority Data
Nov. 15, 2012   (KR) .................. 10-2012-0129602

(51) Int. Cl.
*G06F 17/50* (2006.01)

(52) U.S. Cl.
CPC ....... *G06F 17/5072* (2013.01); *G06F 17/5068* (2013.01); *G06F 2217/40* (2013.01); *H01L 2224/16145* (2013.01); *H01L 2224/16146* (2013.01); *H01L 2224/16225* (2013.01); *H01L 2224/48227* (2013.01); *H01L 2224/73257* (2013.01); *H01L 2225/0651* (2013.01);

(Continued)

(58) Field of Classification Search
CPC .......... G06F 17/5072; G06F 17/5068; G06F 2217/40; H01L 2225/1058; H01L 2225/06513; H01L 2225/15311; H01L 2225/16145; H01L 2224/48227; H01L 2225/0651; H01L 2924/1432; H01L 2224/73257; H01L 2924/15331; H01L 2224/16225; H01L 2225/06568; H01L 2225/1023; H01L 2924/1436; H01L 2225/06517; H01L 2224/16146; H01L 2225/06541

See application file for complete search history.

(56) References Cited

U.S. PATENT DOCUMENTS

| 5,801,959 A | 9/1998 | Ding et al. |
| 7,117,467 B2 | 10/2006 | Ali et al. |

(Continued)

FOREIGN PATENT DOCUMENTS

| JP | 2000003377 A | 1/2000 |
| JP | 2002157296 A | 5/2002 |

(Continued)

*Primary Examiner* — Nha Nguyen
(74) *Attorney, Agent, or Firm* — Renaissance IP Law Group LLP

(57) ABSTRACT

A system for designing a semiconductor package using a computing system, comprising: a virtual stacking module configured to receive a layout parameter for a first chip, a layout parameter for a second chip, and a layout parameter for a package substrate, and in response to the layout parameters of the first chip, the second chip, and the package substrate, generate a plurality of virtual layouts in which the first and second chips are stacked, on the package substrate; a modeling module configured to model operating parameters for the first and second chips and the package substrate in response to the virtual layouts; and a characteristic analyzing module configured to analyze operating characteristics of the virtual layouts in response to the modeled operating parameters.

29 Claims, 15 Drawing Sheets

(52) U.S. Cl.
CPC ............ *H01L2225/06513* (2013.01); *H01L 2225/06517* (2013.01); *H01L 2225/06541* (2013.01); *H01L 2225/06568* (2013.01); *H01L 2225/1023* (2013.01); *H01L 2225/1058* (2013.01); *H01L 2924/1432* (2013.01); *H01L 2924/1436* (2013.01); *H01L 2924/15311* (2013.01); *H01L 2924/15331* (2013.01)

(56) References Cited

U.S. PATENT DOCUMENTS

| | | |
|---|---|---|
| 7,216,324 B2 | 5/2007 | Chang |
| 7,725,847 B2 | 5/2010 | Goto et al. |
| 7,949,984 B2 | 5/2011 | Tanamoto et al. |
| 8,006,212 B2 | 8/2011 | Sinha et al. |
| 8,122,397 B2 | 2/2012 | Lockman et al. |
| 8,146,032 B2 | 3/2012 | Chen et al. |
| 8,181,125 B2 | 5/2012 | Culler et al. |
| 8,543,958 B2 | 9/2013 | Chen et al. |
| 2006/0188673 A1 | 8/2006 | Melvin, III et al. |
| 2006/0214307 A1 | 9/2006 | Chang |
| 2011/0140278 A1 | 6/2011 | Chen et al. |
| 2011/0185323 A1 | 7/2011 | Hogan et al. |
| 2012/0026478 A1* | 2/2012 | Chen .......... G03F 7/70275 355/53 |
| 2014/0096102 A1* | 4/2014 | Fu .......... G06F 17/50 716/133 |

FOREIGN PATENT DOCUMENTS

| | | |
|---|---|---|
| JP | 2005339463 A | 12/2005 |
| JP | 2008305243 A | 12/2008 |
| JP | 2009140397 A | 6/2009 |
| JP | 2010146406 A | 7/2010 |
| TW | 200620017 A | 6/2006 |
| TW | 200634509 | 10/2006 |
| TW | 1308282 B | 4/2009 |
| TW | 201142638 A | 12/2011 |

* cited by examiner

SYSTEM AND METHOD FOR DESIGNING SEMICONDUCTOR PACKAGE USING COMPUTING SYSTEM, APPARATUS FOR FABRICATING SEMICONDUCTOR PACKAGE INCLUDING THE SYSTEM, AND SEMICONDUCTOR PACKAGE DESIGNED BY THE METHOD

CROSS-REFERENCE TO RELATED APPLICATIONS

This application is based on and claims priority from Korean Patent Application No. 10-2012-0129602, filed on Nov. 15, 2012 in the Korean Intellectual Property Office, the disclosure of which is incorporated herein in its entirety by reference.

BACKGROUND

1. Technical Field

The present disclosure relates to a system and method for designing a semiconductor package using a computing system, an apparatus for fabricating a semiconductor package including the system, and a semiconductor package designed by the method.

2. Description of the Prior Art

Various kinds of electronic devices that are used in everyday life are generally fabricated and distributed in the form of a semiconductor package. Such a semiconductor package includes, for example, semiconductor chips that perform various kinds of functions and a package substrate on which the semiconductor chips are mounted.

However, only if all the operating characteristics required in the electronic devices are properly implemented when the semiconductor chips are mounted on the package substrate may the electronic devices show the required function. Accordingly, research for a method and system for designing a semiconductor package that can reliably implement the required operating characteristics have been actively made.

SUMMARY

An embodiment includes a system for designing a semiconductor package using a computing system, comprising: a virtual stacking module configured to receive a layout parameter for a first chip, a layout parameter for a second chip, and a layout parameter for a package substrate, and in response to the layout parameters of the first chip, the second chip, and the package substrate, generate a plurality of virtual layouts in which the first and second chips are stacked, on the package substrate; a modeling module configured to model operating parameters for the first and second chips and the package substrate in response to the virtual layouts; and a characteristic analyzing module configured to analyze operating characteristics of the virtual layouts in response to the modeled operating parameters.

An embodiment includes a method for designing a semiconductor package using a computing system, comprising: receiving a layout parameter for a first chip, a layout parameter for a second chip, and a layout parameter for a package substrate; generating virtual layouts in which the first and second chips are stacked on the package substrate; modeling operating parameters for the first and second chips and the package substrate in response to the virtual layouts; and analyzing operating characteristics of the virtual layouts in response to the modeled operating parameters.

An embodiment includes a computing system comprising: a storage storing therein a program for designing a layout of a semiconductor package, which includes a first chip, a second chip, and a package substrate; and a processor coupled to the storage and configured to operate in response to the program. The program includes a virtual stacking module configured to receive a layout parameter for the first chip, a layout parameter for the second chip, and a layout parameter for the package substrate, and in response to the layout parameters of the first chip, the second chip, and the package substrate, generate virtual layouts, in which the first and second chips are stacked, on the package substrate; a modeling module configured to model operating parameters for the first and second chips and the package substrate in response to the virtual layouts; a characteristic analyzing module configured to analyze operating characteristics of the virtual layouts in response to the modeled operating parameters; and a reviewing module configured to select any one of the plurality of generated virtual layouts in response to the analyzed operating characteristics.

An embodiment includes a semiconductor package comprising: a package substrate; a first chip mounted on the package substrate according to a layout; and a second chip which is mounted on the package substrate according to the layout and is different from the first chip. The layout is determined by: receiving a layout parameter for the first chip, a layout parameter for the second chip, and a layout parameter for the package substrate, and in response to the layout parameters of the first chip, the second chip, and the package substrate, generating a plurality of virtual layouts, to which the first and second chips are stacked, on the package substrate; modeling a plurality of operating parameters for the first and second chips and the package substrate in response to the respective virtual layouts; analyzing operating characteristics of the respective virtual layouts in response to the respective modeled operating parameters; and selecting any one of the virtual layouts in response to the analyzed operating characteristics.

An embodiment includes an apparatus for fabricating a semiconductor package, comprising: a semiconductor package fabricating system receiving a first chip, a second chip, and a package substrate, and mounting the first and second chips on the package substrate according to a layout; and a semiconductor package designing system providing the layout to the semiconductor package fabricating system. The semiconductor package designing system is configured to determine the layout by receiving a layout parameter for the first chip, a layout parameter for the second chip, and a layout parameter for the package substrate, and in response to this, generating a plurality of virtual layouts in which the first and second chips are stacked, on the package substrate; modeling a plurality of operating parameters for the first and second chips and the package substrate in response to the respective virtual layouts; analyzing operating characteristics of the respective virtual layouts in response to the respective modeled operating parameters; and selecting any one of the virtual layouts in response to the analyzed operating characteristics.

Another embodiment includes a system for designing a semiconductor package using a computing system, comprising: a first module configured to generate a plurality of virtual layouts in response to layout parameters of a plurality of chips and a package substrate; a second module configured to generate modeled operating parameters in response to virtual layouts; and a third module configured to generate operating characteristics of the virtual layouts in response to the modeled operating parameters

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE EMBODIMENTS

Figure 1:
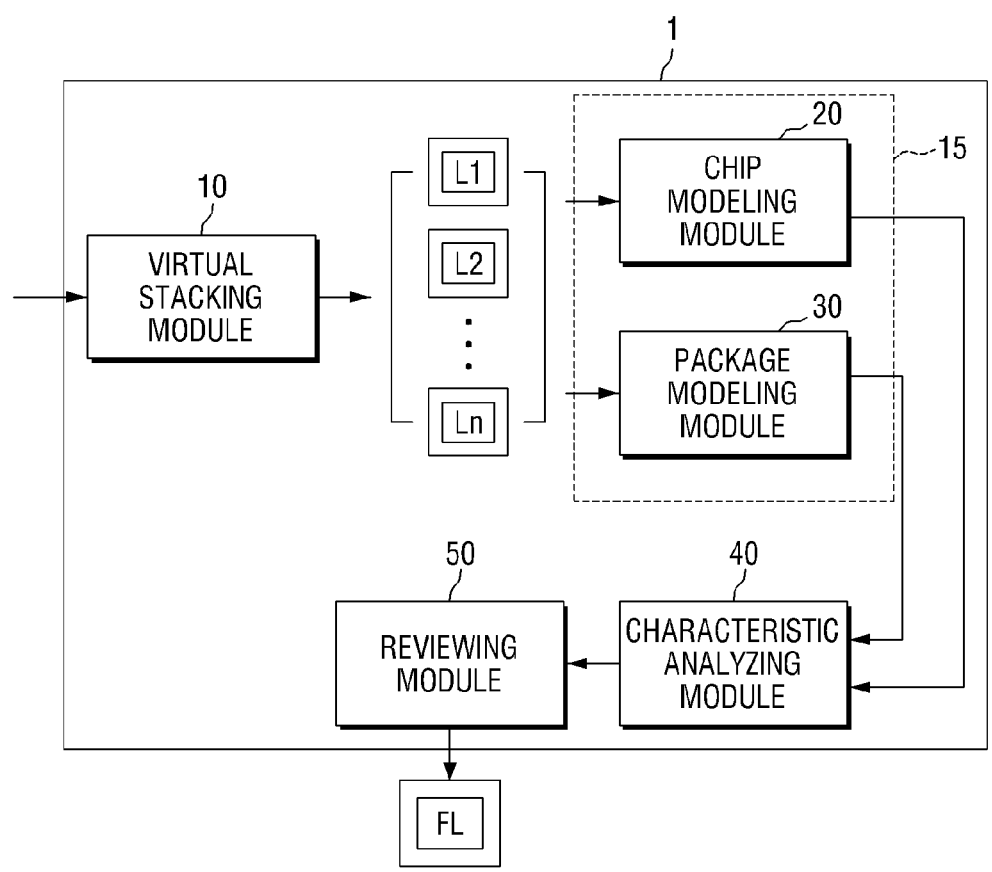
FIG. 1 is a block diagram of a system for designing a semiconductor package according to an embodiment of the present disclosure.

Embodiments of the present disclosure and methods of accomplishing the same may be understood more readily by reference to the following detailed description of embodiments and the accompanying drawings. Embodiments may, however, take many different forms and should not be construed as being limited to the embodiments set forth herein. Rather, these embodiments are provided so that this disclosure will be thorough and complete and will fully convey the concept of the invention to those skilled in the art, and the present disclosure will only be defined by the appended claims. In the drawings, the thickness of layers and regions may be exaggerated for clarity.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure.

Hereinafter, embodiments of the present disclosure will be described in detail with reference to the accompanying drawings.

FIG. 1 is a block diagram of a system for designing a semiconductor package according to an embodiment of the present disclosure. Referring to FIG. 1, a system 1 for designing a semiconductor package includes a virtual stacking module 10, modeling module 15, an analyzing module 40, and a reviewing module 50.

In this embodiment, the term "module" as used herein, means, but is not limited to, a software or hardware component. For example, a module may be a procedure, subroutine, or the like that may be executed on a computing device, such as a general purpose processor, a computer, a server, a workstation, a personal computer, or the like. In another example, a module may be implemented in programmable logic devices such as a field programmable gate array (FPGA), specific purpose processors or circuits such as application specific integrated circuits (ASIC), discrete electronics, or the like. However, the "module" is not limited to software or hardware and may be implemented in any combination of hardware and software.

In some embodiments, the module may be configured to reside on an addressable storage medium and configured to execute on one or more processors. Thus, the module may include, by way of example, components, such as software components, object-oriented software components, class components and task components, processes, functions, attributes, procedures, subroutines, segments of program code, drivers, firmware, microcode, circuitry, data, databases, data structures, tables, arrays, variables, or the like.

The functionality provided for in the components and modules may be combined into fewer components or further separated into additional components and modules. Moreover, multiple modules may be implemented together and/or separated into atomic components.

In another embodiment, the system 1 for designing a semiconductor package may operate based on a computing system. That is, respective components constituting the system 1 for designing a semiconductor package according to this embodiment may be implemented to operate on the computing system. The details thereof will be described later.

The virtual stacking module 10 may be configured to receive a layout parameter for a first chip, a layout parameter for a second chip that is different from the first chip, and a layout parameter for a package substrate, and based on this, generate a plurality of virtual layouts L1 to Ln, to which the first and second chips are stacked, on the package substrate.

In some embodiments, the virtual stacking module 10 may be a module configured to generate the virtual layouts L1 to Ln for a package on which different kinds of chips are packaged. Here, the package on which different kinds of chips are packaged may be, for example, an SIP (System In Package).

The first chip may include, for example, a memory chip such as a DRAM (Dynamic Random Access Memory) chip, and the second chip may include, for example, a processor chip such as an AP (Application Processor) chip. That is, the plurality of virtual layouts L1 to Ln, which are generated by the virtual stacking module 10 according to this embodiment, may be the plurality of virtual layouts L1 to Ln regarding the SIP on which the memory chip and the processor chip are packaged into one package.

The layout parameter for the first chip, the layout parameter for the second chip, and the layout parameter for the package substrate, may be provided to the virtual stacking module 10 to generate the plurality of virtual layouts L1 to Ln in the form of a library or libraries. That is, the virtual stacking module 10 according to this embodiment may receive an input of a first chip library including the layout parameter for the first chip, a second chip library including the layout parameter for the second chip, and a package substrate library including the layout parameter for the package substrate. The virtual stacking module 10 may generate the virtual layouts L1 to Ln as described above.

The layout parameters for the first and second chips provided in the form of a library may include a variety of different attributes related to the first and second chips. For example, the layout parameters may include the sizes of the first and second chips, pad arrangement types, a number of pads, a pitch between the pads, or the like. The layout parameter for the package substrate may also include a variety of different attributes. For example, the layout parameter for the package substrate may include a size of the package substrate, arrangement types of package balls, a number of package balls, a pitch between the package balls, or the like. Although particular examples have been listed, the layout parameters may include other different parameters.

In some embodiments, the virtual layouts L1 to Ln which are generated by the virtual stacking module 10 may be 3D virtual layouts L1 to Ln. That is, in the respective virtual layouts L1 to Ln, the first chip, the second chip, and the package substrate are not arranged on the same plane, but may be arranged in an upper-lower relation. For example, in some embodiments, in the respective virtual layouts L1 to Ln, the second chip may be arranged on the package substrate and the first chip may be arranged on the second chip.

The modeling module 15 is configured to perform modeling of operating parameters for the various components of in the semiconductor package. For example, the modeling module 15 may include multiple modeling modules, each configured to model a different aspect of the semiconductor package. Such modeling modules may include modules to model chips, substrates, interconnections, wirebonds, balls, combinations of such devices and structures, or the like.

In an embodiment, the modeling module 15 may include modeling modules 20 and 30. The modeling modules 20 and 30 may be configured to perform modeling of the operating parameters for the first and second chips and the package substrate based on the virtual layouts L1 to Ln generated by the virtual stacking module 10.

In some embodiments, the modeling modules 20 and 30 are implemented to be separated into a chip modeling module 20 configured to perform modeling of the operating parameters of the first and second chips included in the virtual layouts L1 to Ln based on the respective virtual layouts L1 to Ln, and a package modeling module 30 which is implemented to be separated from the chip modeling module 20 and configured to perform modeling of the operating parameter of the package substrate included in the respective virtual layouts L1 to Ln based on the respective virtual layouts L1 to Ln.

In some embodiments, the operating parameters of which the modeling modules 20 and 30 perform modeling may include signal parameters and power parameters. For example, the chip modeling module 20 can perform modeling of a model for signal inputs and/or outputs of the first and second chips included in the respective virtual layouts L1 to Ln and a model for power inputs and/or output, and the package modeling module 30 can perform modeling of a model for signal inputs and/or outputs of the package substrate included in the respective virtual layouts L1 to Ln and a model for power inputs and/or outputs.

The characteristic analyzing module 40 may be configured to analyze the operating characteristics of the respective virtual layouts L1 to Ln based on the operating parameters of the first and second chips modeled by the chip modeling module 20 and the operating parameters of the package substrate modeled by the package modeling module 30. In some embodiments, the operating parameters of the respective virtual layouts L1 to Ln may include signal integrity, power integrity, and temperature integrity of the respective virtual layouts L1 to Ln.

The reviewing module 50 may be a module configured to select the virtual layout having the most superior operating characteristic as a final layout FL based on the analysis result of the operating characteristics of the respective virtual layouts L1 to Ln analyzed by the characteristic analyzing module 40. The final layout FL selected by the reviewing module 50 as described above may be used as the layout to package the first and second chips and the package substrate in the following packaging process.

Hereinafter, referring to FIGS. 1 to 10, a method for designing a semiconductor package according to an embodiment will be described.

Figure 2:
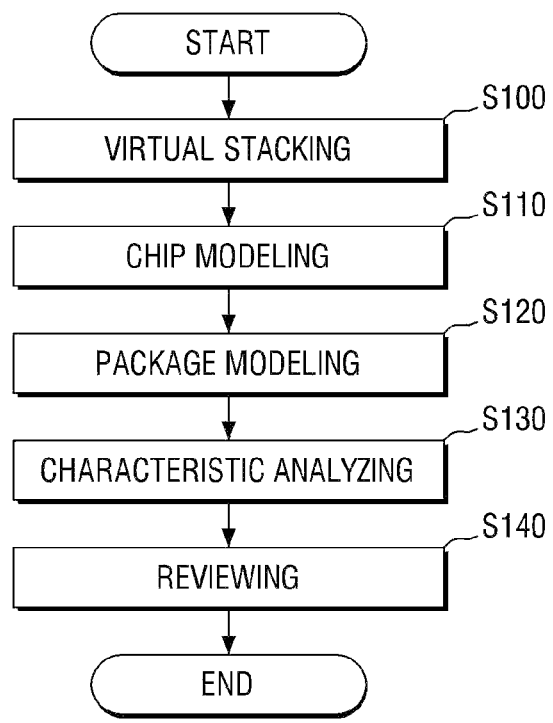
FIG. 2 is a flowchart of a method for designing a semiconductor package according to an embodiment of the present disclosure.

FIG. 2 is a flowchart of a method for designing a semiconductor package according to an embodiment of the present inventive concept. FIGS. 3 to 10 are views explaining a method for designing a semiconductor package according to an embodiment of the present inventive concept.

Referring to FIG. 2, a layout parameter for a first chip, a layout parameter for a second chip that is different from the first chip, and a layout parameter for a package substrate are provided. Based on this, a plurality of virtual layouts in which the first and second chips are stacked are generated on the package substrate in S100. For example, referring to FIG. 1, the virtual stacking module 10 may be configured to receive the layout parameter for the first chip, the layout parameter for the second chip that is different from the first chip, and the layout parameter for the package substrate, and based on this, generate the virtual layouts L1 to Ln, to which the first and second chips are stacked, on the package substrate.

Figure 3:
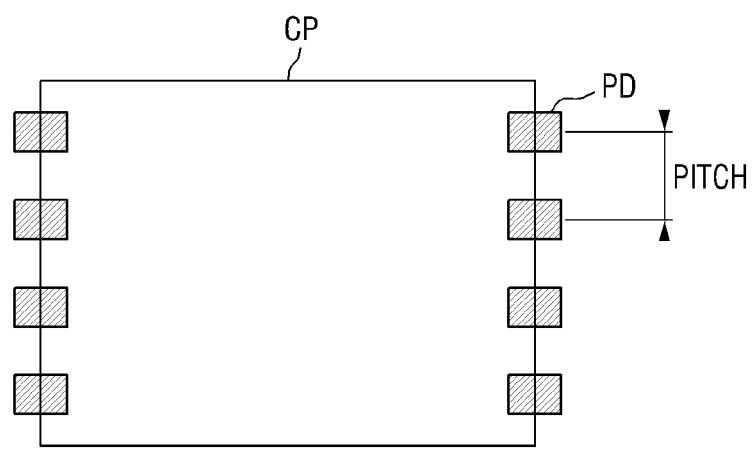
FIGS. 3 to 10 are views explaining a method for designing a semiconductor package according to an embodiment of the present disclosure.

In this case, the layout parameter for the chip may be provided to the virtual stacking module 10 in the form of a library. The layout parameters for the chip may include, for example, as illustrated in FIG. 3, the size of a chip CP, an arrangement type of pads PD, the number of pads PD, a pitch between the pads PD, locations of the pads PD, shape of the pads PD, functional assignments of the pads PD, or the like. In other embodiments, the layout parameters may include more parameters, less parameters, different parameters, or the like.

Figure 4:
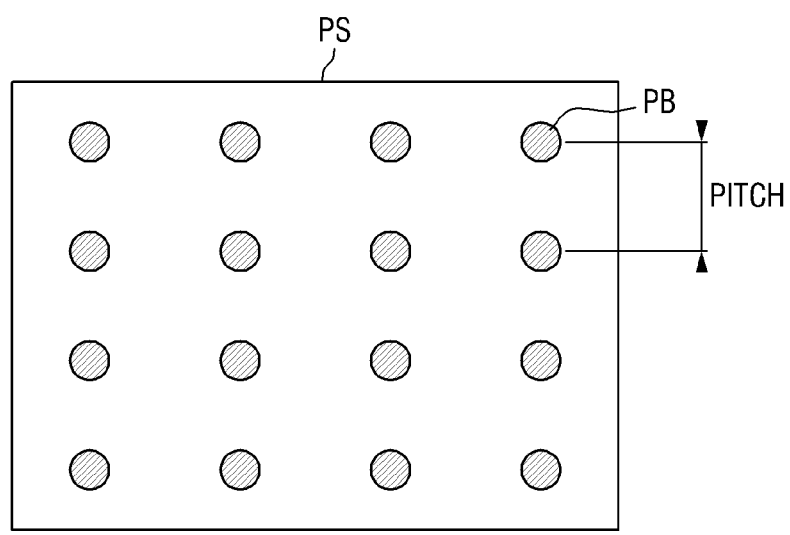

On the other hand, the layout parameter for the package substrate may also be provided to the virtual stacking module 10 in the form of a library. The layout parameters for the package substrate may include, for example, as illustrated in FIG. 4, the size of a package substrate PS, an arrangement type of package balls PB, dimensions of the package balls PB, the number of package balls PB, a pitch between the package balls PB, or the like. In other embodiments, the layout parameters may include more parameters, less parameters, different parameters, or the like.

Figure 5:
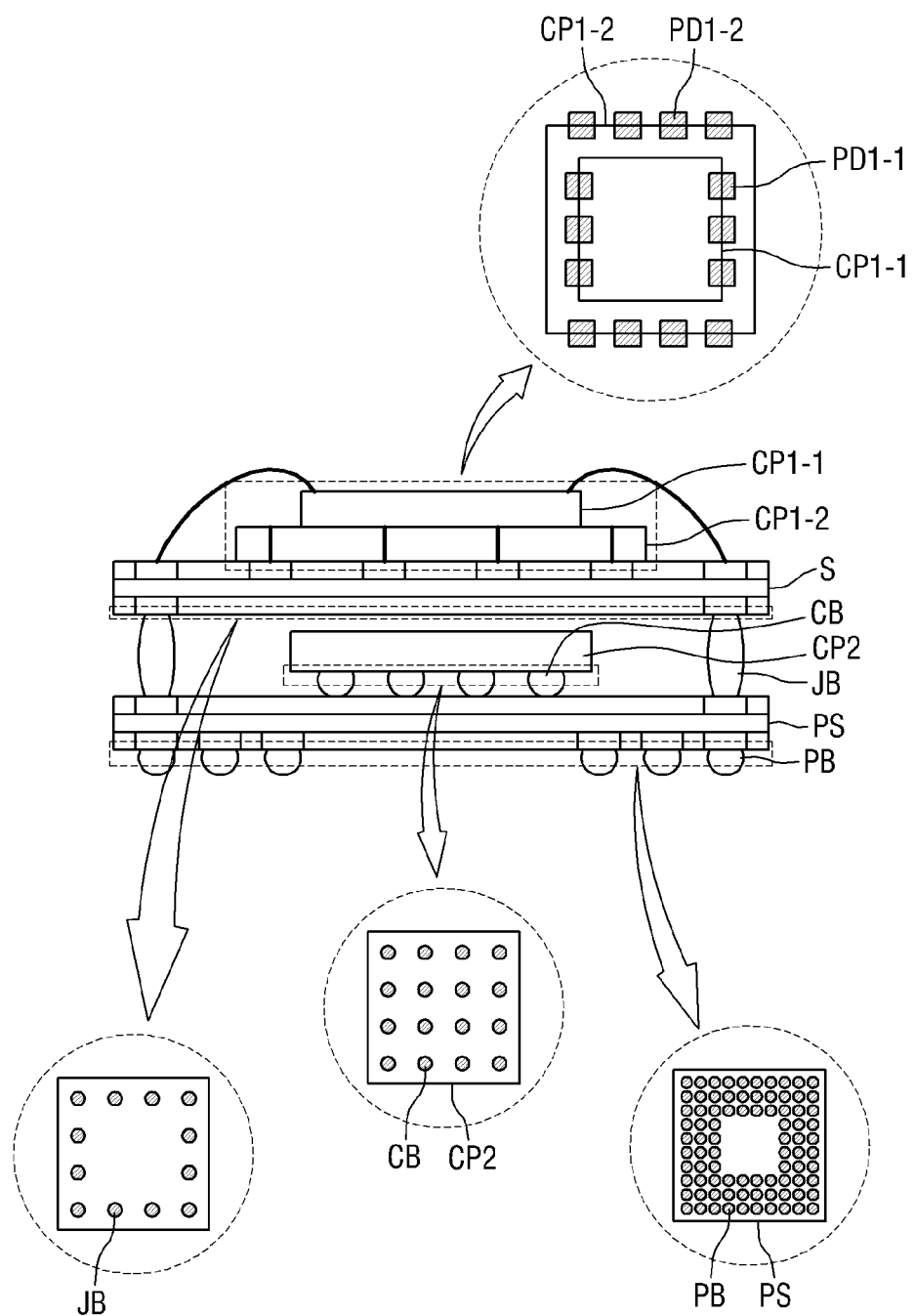

In some embodiments, the plurality of virtual layouts L1 to Ln which are generated by the virtual stacking module 10 may be 3D virtual layouts L1 to Ln as illustrated in FIG. 5. As an example, FIG. 5 illustrates a virtual layout in which a second chip CP2 is arranged on the package substrate PS and first chips CP1-1 and CP1-2 are arranged on a substrate S which is arranged on the second chip CP2.

In some embodiments, the first chips CP1-1 and CP1-2 may be, for example, memory chips such as DRAM (Dynamic Random Access Memory) chips, and the second chip CP2 may include, for example, a processor chip such as an AP (Application Processor) chip. FIG. 5 illustrates that the first chip CP1-1 has a smaller size and the first chip CP1-2 has a larger size. However, in other embodiments, the first chips CP1-1 and CP1-2 may be the same size, first chip CP1-1 may be larger, or the like.

The virtual layout generated by the virtual stacking module 10 may define connection relations among respective pads PD1-1 and PD1-2 of the first chips CP1-1 and CP1-2, respective chip balls CB of the second chip CP2, respective package balls PB of the package substrate PS, and respective joint balls JB connecting the substrate S with the first and second chips CP1-1, CP1-2, and CP2 to the package substrate PS. That is, for example, if the first chips CP1-1 and CP1-2 are DRAM chips, it may be defined whether the respective chip pads PD1-1 and PD1-2 of the first chips CP1-1 and CP1-2 are data input or output pads or address or control pads, or the like depending on the generated virtual layout, and it may also be defined whether the joint balls JB and the package balls PB of the package substrate PS are data input or output balls or address or control balls, or the like.

Referring again to FIG. 2, operating parameters for the first and second chips included in the respective generated virtual layouts are modeled on the basis of the respective generated virtual layouts in S110. Specifically, referring to FIG. 1, the chip modeling module 20 may be configured to perform modeling of the operating parameters for the first and second chips included in the respective virtual layouts L1 to Ln based on the respective virtual layouts L1 to Ln. In this case, the operating parameters for the first and second chips modeled by the chip modeling module 20 may include signal parameters, control parameters, power parameters, or the like.

Figure 6:
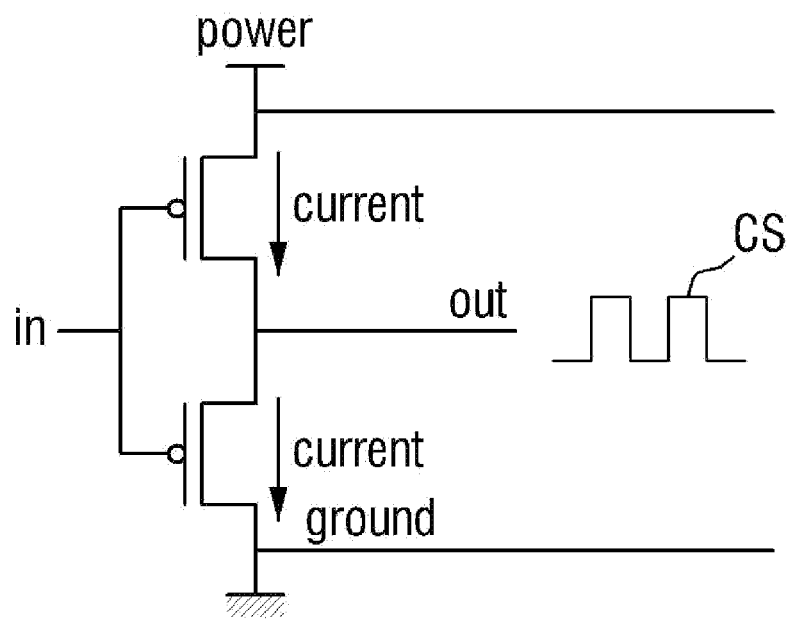

Specifically, the chip modeling module 20 may be configured to receive information on the first and second chips of the respective virtual layouts L1 to Ln, and perform modeling of, for example, a chip I/O model as illustrated in FIG. 6, with the signal parameters of the first and second chips. Although FIG. 6 illustrates the chip I/O model that outputs an output signal CS as the signal parameter modeled by the chip modeling module 20, the model related to the signal parameters for the first and second chips modeled by the chip modeling module 20 is not limited to that as illustrated and may be modeled with different components, different designs, multiple outputs, or the like.

Figure 7:
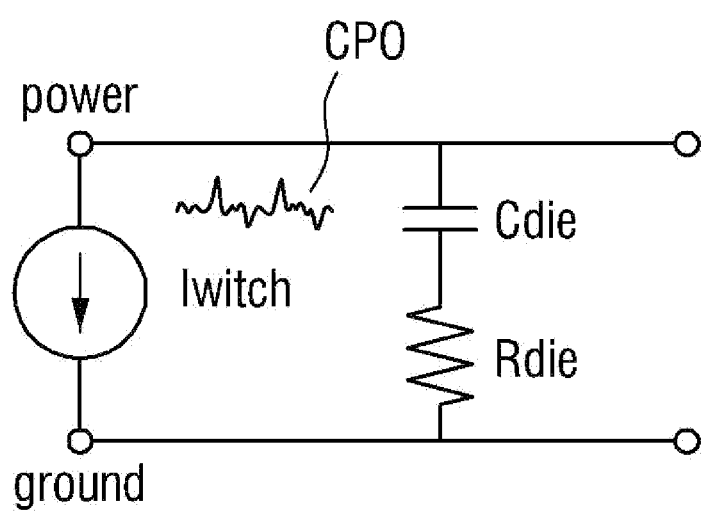

Further, the chip modeling module 20 may be configured to receive information on the first and second chips of the respective virtual layouts L1 to Ln, and perform modeling of, for example, a chip power model as illustrated in FIG. 7, with the signal parameters of the first and second chips. Although FIG. 7 illustrates the chip power model that outputs an output power CPO as the power parameter modeled by the chip modeling module 20, the model related to the power parameters for the first and second chips modeled by the chip modeling module 20 is not limited to that as illustrated and may be modeled with different components, different designs, multiple outputs, or the like.

If the modeling of the first and second chips is completed, the signal CS output from the first and second chips and the output power CPO of the first and second chips may be defined. These may be used to analyze the operating characteristics of the respective virtual layouts L1 to Ln thereafter.

Referring again to FIG. 2, the operating parameters of the package substrate included in the respective virtual layouts generated based on the respective generated virtual layouts are modeled in S120. Specifically, referring to FIG. 1, the package modeling module 30 may perform modeling of the operating parameters of the package substrate included in the respective virtual layouts L1 to Ln based on the respective virtual layouts L1 to Ln. In this case, the operating parameters of the package substrate modeled by the package modeling module 30 may also include the signal parameters and the power parameters.

For example, the package modeling module 30 may perform modeling of the signal parameter of the package substrate by performing modeling based on the length of a signal path of the package substrate defined in each of the virtual layouts, and perform modeling of the power parameter of the package substrate by performing modeling based on the power line of the package substrate defined in each of the virtual layouts.

As described above, respective signal lines and power lines in the semiconductor package may be defined by the respective virtual layouts. Accordingly, the package modeling module 30 may perform modeling of the signal parameters and the power parameters of the package substrate, for example, based on dimensions of the signal lines and the power lines defined in the package substrate.

Figure 8:
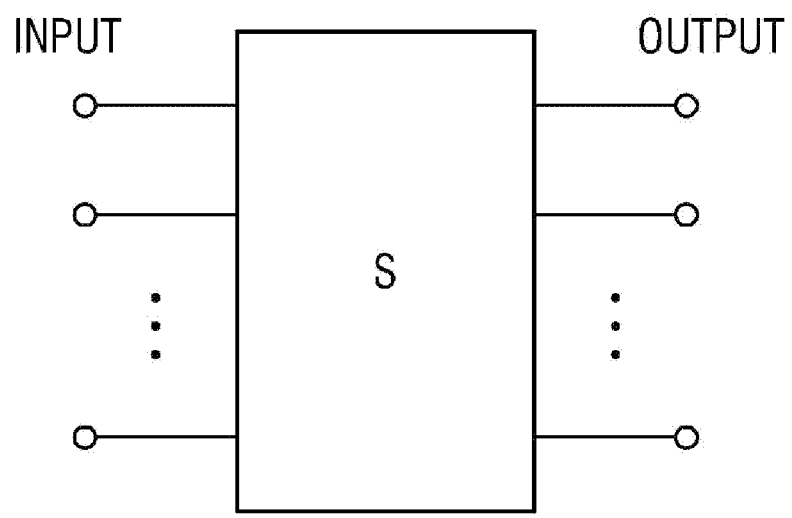

In some embodiments, the operating parameters of the package substrate modeled by the package modeling module 30 may include a multi-port S-parameter model for the package substrate as illustrated in FIG. 8, an RLC network model, but other embodiments are not limited thereto and may include other modeling techniques.

Referring again to FIG. 2, operating characteristics of the generated virtual layouts based on the modeled operating parameters are analyzed in S130. Specifically, referring to FIG. 1, the characteristic analyzing module 40 may be configured to analyze the operating characteristics of the respective virtual layouts L1 to Ln based on the operating parameters of the first and second chips modeled by the chip modeling module 20 and the operating parameters of the package substrate modeled by the package modeling module 30. In some embodiments, the operating characteristics of the respective virtual layouts L1 to Ln may include signal integrity, power integrity, and temperature integrity of the respective virtual layouts L1 to Ln.

Figure 9:
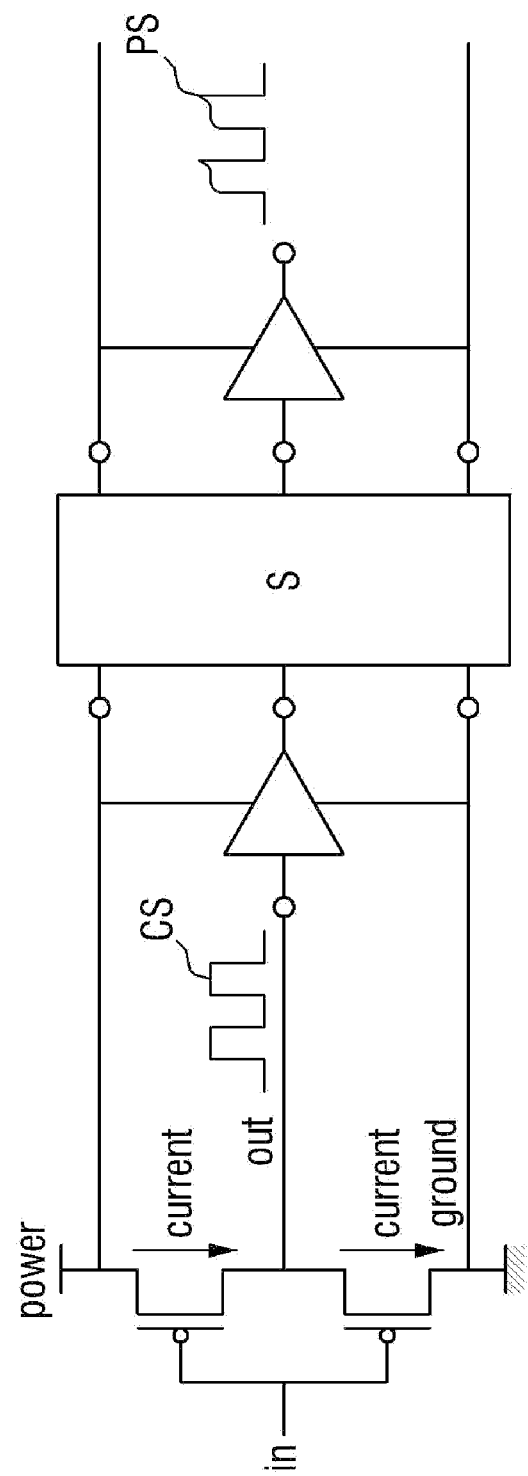

For example, as illustrated in FIG. 9, the characteristic analyzing module 40 may analyze the signal integrity of the semiconductor package by analyzing whether the output signal PS of the semiconductor package coincides with the required specification based on the operating parameter (for example, the chip I/O model that outputs the CS) of the first and second chips modeled by the chip modeling module 20 as described above and the operating parameter (for example, the S-parameter model) of the package substrate modeled by the package modeling module 30. An example of such an analyzing method may be signal eye analysis, but other embodiments not limited thereto and other analysis techniques, other attributes of the output signal PS or the like may be analyzed.

Figure 10:
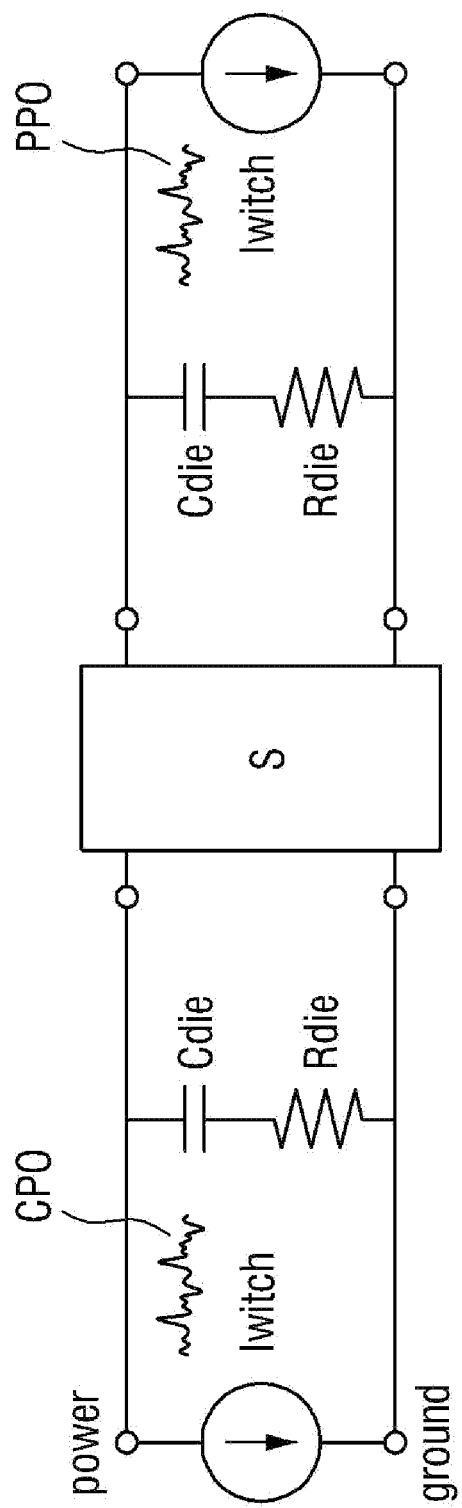

In another example, as illustrated in FIG. 10, the characteristic analyzing module 40 may analyze the power integrity of the semiconductor package by analyzing whether the output power PPO of the semiconductor package coincides with the required specification based on the operating parameter (for example, the chip power model that outputs the CPO) of the first and second chips modeled by the chip modeling module 20 as described above and the power parameter (for example, the S-parameter model) of the package substrate modeled by the package modeling module 30.

Further, although not illustrated, the characteristic analyzing module 40 may analyze the temperature integrity of the semiconductor package by generating a power map of the semiconductor package and analyzing whether the temperature characteristic of the semiconductor package coincides with the required specification based on the operating parameter (for example, the chip power model that outputs the CPO) of the first and second chips modeled by the chip modeling module 20 as described above.

Although the analyzing of the signal integrity and power integrity of the semiconductor package have been described independently, such analyzing may be performed together. For example, the signal integrity may be analyzed for different power levels, the power integrity may be analyzed for different signal outputs, or the like.

Referring again to FIG. 2, the virtual layout having a better or best operating characteristic may be selected based on the analysis result of the operating characteristics of the respective virtual layouts in S140. Specifically, referring to FIG. 1, the reviewing module 50 may select the virtual layout having the most superior operating characteristic as a final layout FL based on the analysis result of the operating characteristics of the respective virtual layouts L1 to Ln analyzed by the characteristic analyzing module 40.

In an embodiment the receiving module 50 may be configured to select an operating characteristic based on a variety of desired characteristics. For example, one set of desired characteristics may favor signal integrity of some signals over others. Moreover, different sets of desired characteristics may be used that result in different virtual layouts being selected as having a better of best operating characteristic.

Furthermore, although operating characteristics have been used as an example of desired characteristics, other characteristics associated with a final layout may be used to select a virtual layout. For example, a relative cost of a virtual layout, an availability of parts and/or materials, or the like may be used to select a virtual layout.

According to the method for designing a semiconductor package according to this embodiment, the cost for packaging the different kinds of chips with 3D arrangements may be reduced if not greatly reduced. For example, when using other design techniques, designing of the package substrate may be performed after a floor plan for the respective chips is performed, and the operating characteristics may be analyzed by stacking the designed chip and the package substrate. If the characteristics of the whole semiconductor package finally designed do not meet the required specification, the floor plan for the respective chips may be re-performed from the first. Such design change may cause the increase of the design cost of the semiconductor package.

According to an embodiment, to minimize unnecessary repetitions that cause the increase of the design cost, the plurality of virtual layouts L1 to Ln are first generated based on the layout parameters for the chips and the package substrate, and the virtual layout having a superior characteristics among the plurality of virtual layouts is selected in advance. Accordingly, the above-described unnecessary repetitions need not occur.

In an embodiment, the method for designing a semiconductor package as described above may be implemented as a computer-readable code recorded on a computer-readable recording medium. Here, the computer-readable recording medium may include all kinds of recording devices in which data that can be read by a computer system is stored.

Examples of computer-readable recording media may include a ROM, a RAM, a CD-ROM, a magnetic tape, a floppy disc, and an optical data storage device, and may be implemented in the form of carrier waves (for example, transmission through the Internet). In another embodiment, the computer readable medium may be a non-transitory medium. Further, in the computer-readable recording medium which is distributed in a computer system connected through a network, codes that can be read by a computer in a distribution method may be stored and executed.

Hereinafter, referring to FIGS. 11 and 12, a semiconductor package that is fabricated by a virtual layout selected according to the method for designing a semiconductor package according to some embodiments will be described.

Figure 11:
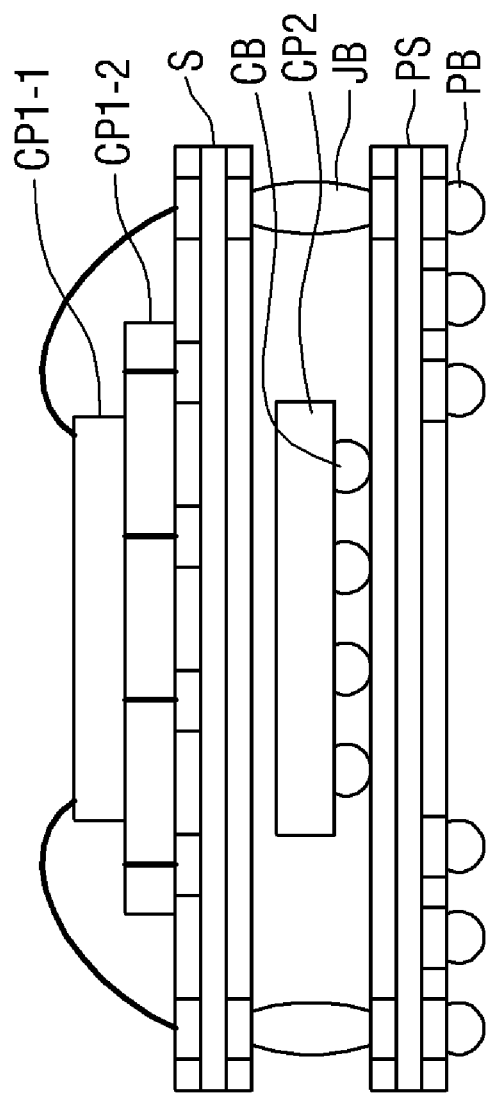
FIG. 11 is a cross-sectional view of a semiconductor package according to an embodiment of the present disclosure.
Figure 12:
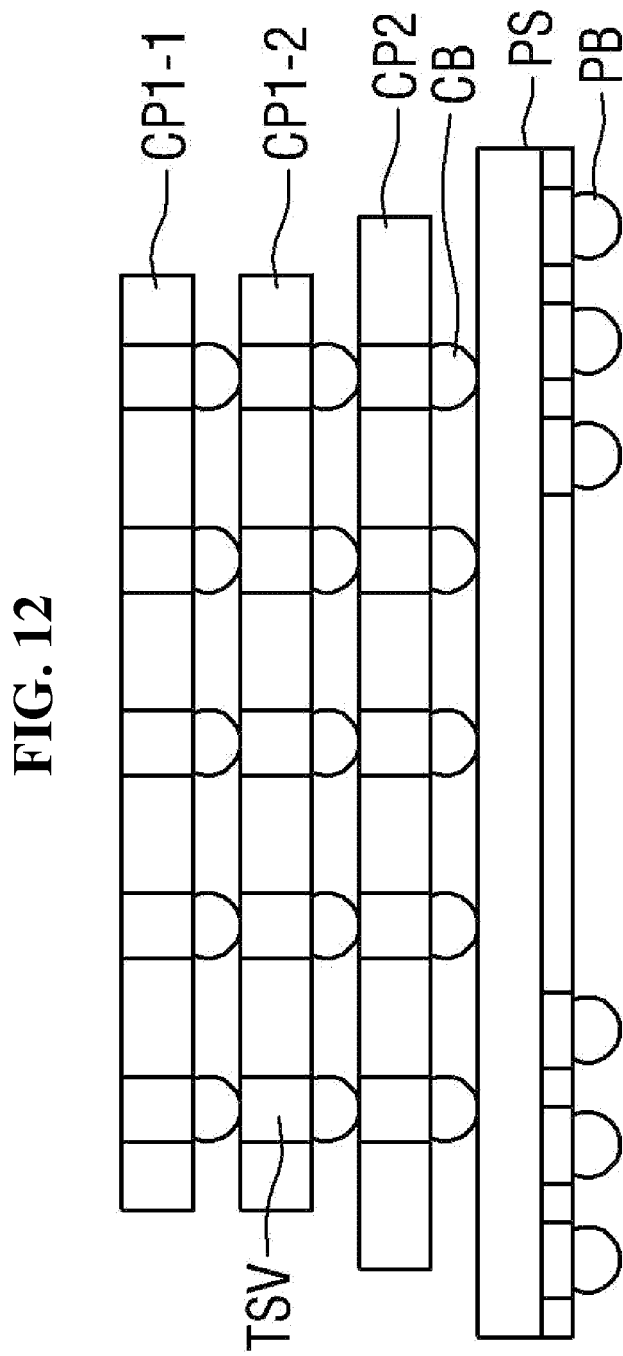
FIG. 12 is a cross-sectional view of a semiconductor package according to another embodiment of the present disclosure.

FIG. 11 is a cross-sectional view of a semiconductor package according to an embodiment of the present inventive concept, and FIG. 12 is a cross-sectional view of a semiconductor package according to another embodiment of the present inventive concept.

First, referring to FIG. 11, a semiconductor package illustrated in FIG. 11 may be an SIP. The SIP may include package substrates PS1 and PS2, first chips CP1-1 and CP1-2, and a second chip CP2.

The package substrate PS may include a plurality of package balls PB. The plurality of package balls PB may be electrically connected to chip balls CB of the second chip CP through signal lines in the package substrate PS, and may be electrically connected to joint balls JB through signal lines in the package substrate PS.

The first chips CP1-1 and CP1-2 may have different sizes. As illustrated, the first chip CP1-1 may be arranged on the first chip CP1-2. The first chips CP1-1 and CP1-2 may be, for example, memory chips such as DRAM (Dynamic Random Access Memory) chips, and may be electrically connected to the substrate S through wire bonding as illustrated. The substrate S may include conductive lines that electrically connect the wirebonds to the joint balls JB.

The second chip CP2 may be arranged below the first chips CP1-1 and CP1-2. The chip balls CB of the second chip CP2 may be electrically connected to the first chips CP1-1 and CP1-2 through the joint balls JB. The second chip CP2 may be, for example, a processor chip such as an AP (Application Processor) chip.

Here, the SIP, which includes the package substrates PS1 and PS2, the first chips CP1-1 and CP1-2, and the second chip CP2, may be, for example, in the form of PoP (Package on Package) as illustrated, and the package substrates PS1 and PS2, the first chips CP1-1 and CP1-2, and the second chip CP2 may be electrically connected to one another by the virtual layout selected according to the method for designing a semiconductor package according to some embodiments.

On the other hand, the semiconductor package fabricated by the virtual layout selected according to the method for designing a semiconductor package according to some embodiments is not limited to that as illustrated in FIG. 11. In some embodiments, the semiconductor package fabricated by the virtual layout selected according to the method for designing a semiconductor package according to some embodiments may be fabricated, for example, in the form of MCP (Multi-Chip Package), SSMCP (Side-by-Side Multi-Chip Package), PiP (Package in Package), or the like.

However, the virtual layout selected according to the method for designing a semiconductor package according to some embodiments is not limited to the package fabricated in the above-described method.

Referring to FIG. 12, the semiconductor package includes the package substrate PS, the first chips CP1-1 and CP1-2, and the second chip CP2. As illustrated, the package substrate PS, the first chips CP1-1 and CP1-2, and the second chip CP2 may be electrically connected to one another through TSVs (Through Silicon Vias).

Here, the TSVs (Through Silicon Vias) can electrically connect the package substrate PS, the first chips CP1-1 and CP1-2, and the second chip CP2 in a method defined by the virtual layout selected according to the method for designing a semiconductor package according to some embodiments as described above.

As described above different semiconductor packaging techniques may be used, such as those described with respect to FIGS. 11 and 12. In an embodiment, the virtual layouts L1 to Ln described above may encompass layouts using both packaging techniques and other packaging techniques. Accordingly, the receiving module 50 described above may also be configured to select from among virtual layouts L1 to Ln associated with the different packaging techniques.

Hereinafter, referring to FIG. 13, an apparatus for fabricating a semiconductor package, which includes the system for designing a semiconductor package according to some embodiments, will be described.

Figure 13:
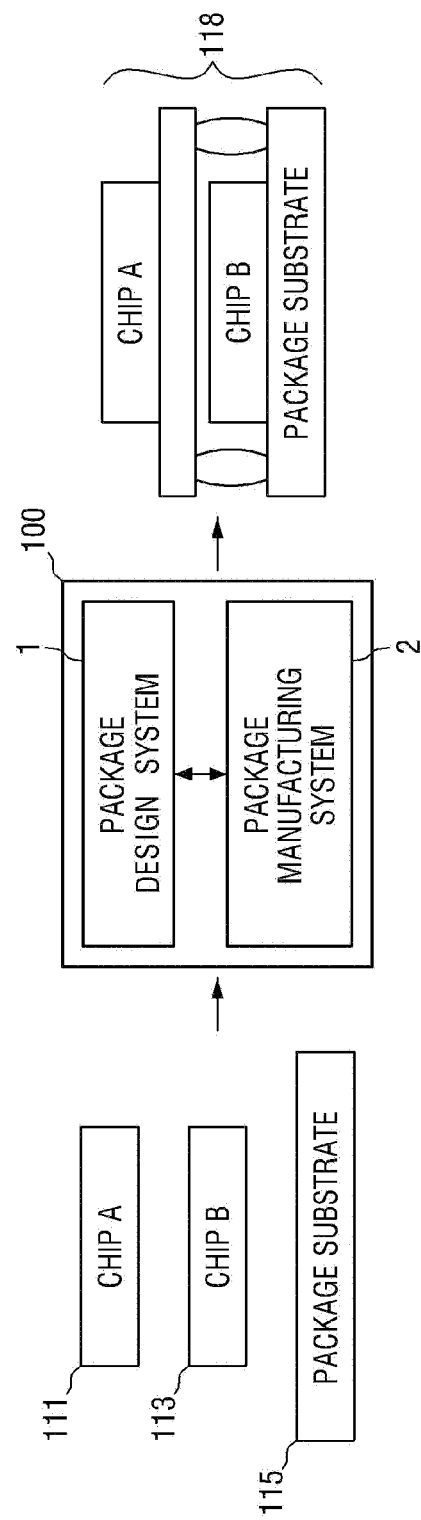
FIG. 13 is a block diagram of an apparatus for fabricating a semiconductor package according to an embodiment of the present disclosure.

FIG. 13 is a block diagram of an apparatus for fabricating a semiconductor package according to an embodiment of the present inventive concept. Referring to FIG. 13, the apparatus 100 for fabricating a semiconductor package includes the system 1 for designing a semiconductor package as described above and a system 2 for fabricating a semiconductor package.

The system 1 for designing a semiconductor package, according to the above-described method, may be configured to generate a plurality of virtual layouts L1 to Ln (in FIG. 1) for a first chip 111, a second chip 113, a package substrate 115, or other similar devices and structures, analyze the operating characteristics of the respective virtual layouts L1 to Ln, and output the virtual layout having the operating characteristic as a final layout FL (in FIG. 1) based on the result of analysis.

The system 2 for fabricating a semiconductor package may receive the first chip 111, the second chip 113, the package substrate 115, or other similar devices and structures, and package the first chip 111, the second chip 113, the package substrate 115, or the like according to the final layout FL (in FIG. 1) output from the system 1 for designing a semiconductor package to fabricate a semiconductor package 118.

In some embodiments, the system 1 for designing a semiconductor package may be embedded to the apparatus 100 for fabricating a semiconductor package, and the system 1 for designing a semiconductor package and the system 2 for fabricating a semiconductor package may interact with each other to fabricate the semiconductor package 118.

Hereinafter, referring to FIGS. 14 and 15, a computing system adopted in the system for designing a semiconductor package according to some embodiments and the operation thereof will be described.

Figure 14:
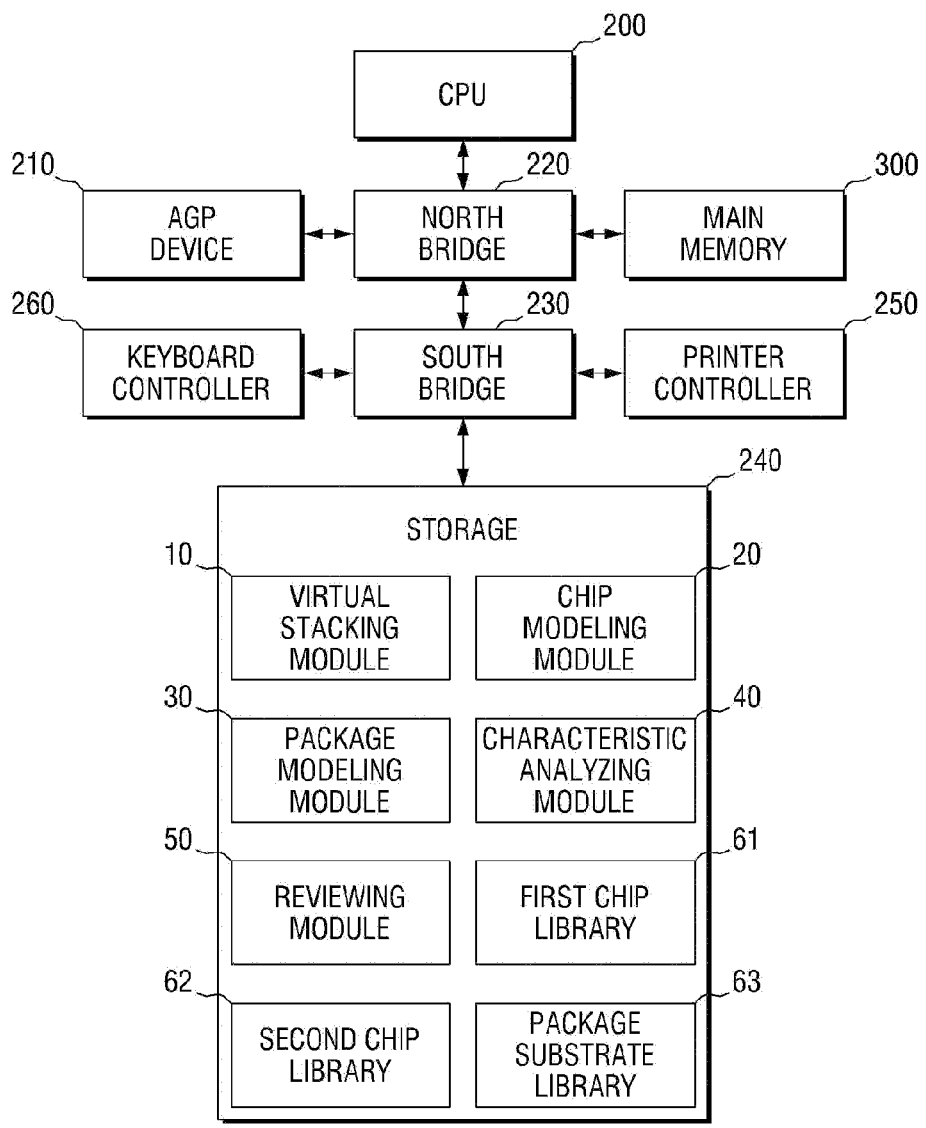
FIG. 14 is a diagram of an example of a computing system that adopts the system for designing a semiconductor package according to the embodiments of the present disclosure.
Figure 15:
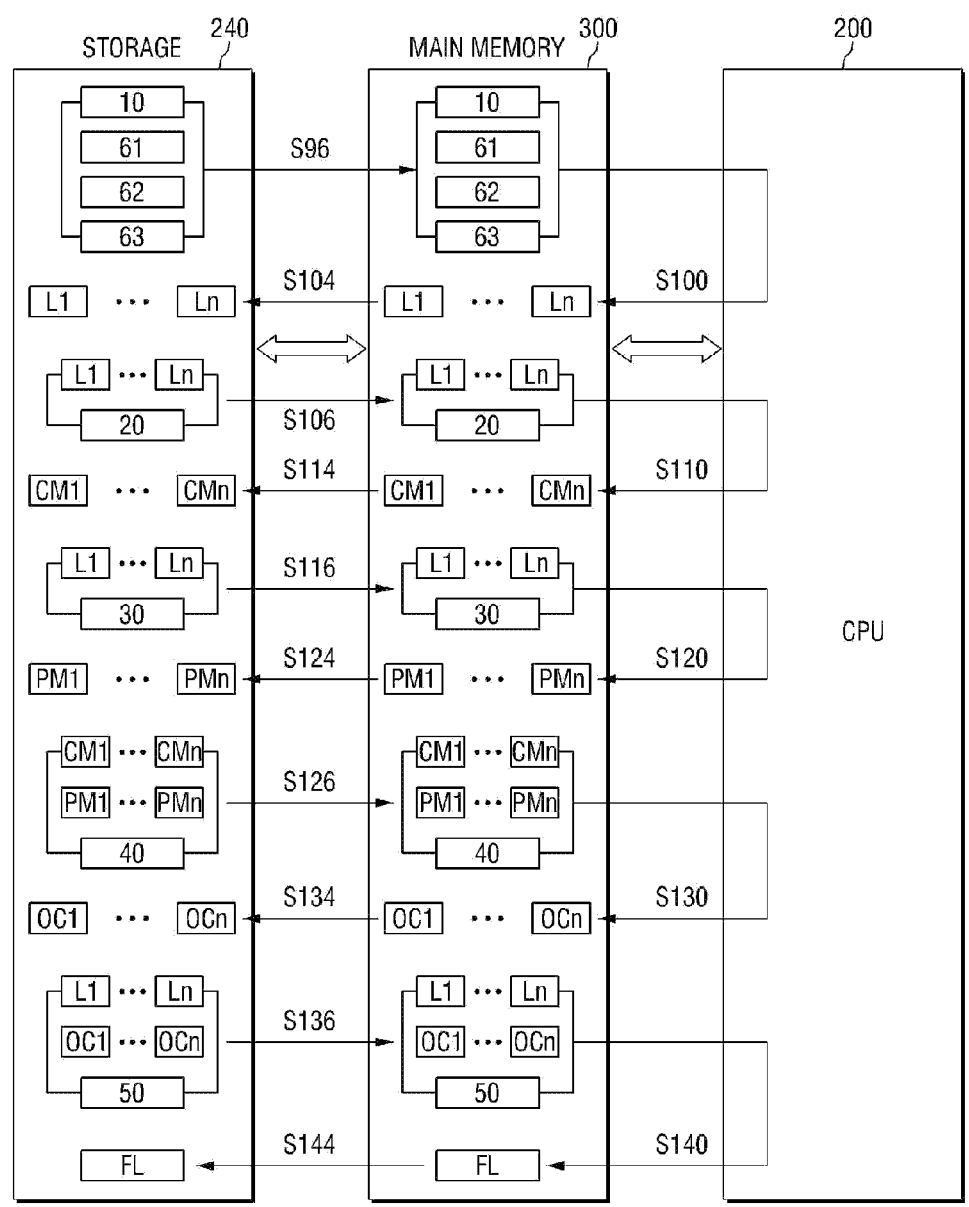
FIG. 15 is a diagram explaining an operation of the computing system of FIG. 14.

FIG. 14 is a diagram of an example of a computing system that adopts the system for designing a semiconductor package according to some embodiments, and FIG. 15 is a diagram explaining an operation of the computing system of FIG. 14.

First, referring to FIG. 14, the system (for example, 1 in FIG. 1) for designing a semiconductor package according to some embodiments as described above may be implemented by software or the like, and may be adopted in a computing system 201 as illustrated.

Referring to FIG. 14, the computing system 201 may include a central processing unit 200, an AGP (Accelerated Graphics Port) device 210, a main memory 300, a storage (for example, SSD, HDD, or the like) 240, a north bridge 220, a south bridge 230, a keyboard controller 260, and a printer controller 250. In FIG. 14, only the above-described constituent elements are illustrated as constituent elements that are included in the computing system 201. However, other embodiments are not limited thereto, and the constituent elements included in the computing system 201 may be added without limit, or may be omitted from the configuration illustrated in FIG. 14.

The computing system 201 illustrated in FIG. 14 may be an office computer or a notebook computer that is used in a semiconductor packaging process. However, other embodiments are not limited thereto, and examples of the computing system 201 may be modified without limit.

In the computing system 201, the central processing unit 200, the AGP device 210, and the main memory 300 may be connected to the north bridge 220. However, other embodiments are not limited thereto, and the north bridge 220 may be modified in the form included in the central processing unit 200.

The AGP may be a bus standard that enables 3D graphic expression to be rapidly implemented, and the AGP device 210 may include a video card that reproduces a monitor image. Although an AGP device 210 has been described other peripheral connection techniques may be used. Moreover, a graphics device may be included in the central processing unit 200 instead of or in addition to the AGP device 210.

The central processing unit 200 may be configured to perform various kinds of operations that are required to drive the computing system 201, and execute OS and application programs.

The main memory 300 may be configured to load data that is required to perform the operation of the central processing unit 200 from the storage 240 and store the loaded data therein. An example of a memory that implements the main memory 300 may be a DRAM (Dynamic Random Access Memory), but is not limited thereto.

The storage 240, the keyboard controller 260, the printer controller 250, and various kinds of peripheral devices (not illustrated) may be connected to the south bridge 230.

The storage 240 may be a mass data storage device that stores data, and may be implemented by a computer-readable recording medium, such as a hard disk drive (HDD) or solid state drive (SSD). However, other embodiments are not limited thereto. Further, although the computing system 201 according to this embodiment has a structure in which the storage 240 is connected to the south bridge 230, other embodiments are not limited thereto, and the storage 240 may be modified so that it is connected to the north bridge 220 or directly connected to the central processing unit 200.

If the computing system 201 according to this embodiment adopts the system (for example, 1 in FIG. 1) for designing a semiconductor package according to some embodiments that is implemented, for example, by software, the system (for example 1 in FIG. 1) for designing a semiconductor package may be stored in, for example, the storage 240 as described above.

For example, in the storage 240, the virtual stacking module 10, the chip modeling module 20, the package modeling module 30, the characteristic analyzing module 40, and the reviewing module 50, which constitute the system (for example, 1 in FIG. 1) for designing a semiconductor package according to some embodiments, may be implemented and stored by modules.

Further, in the storage 240, a first chip library 61 including a layout parameter for the first chip, a second chip library 62 including a layout parameter for the second chip, and a package substrate library 63 including a layout parameter for the package substrate, which are provided as inputs to drive the system (for example, 1 in FIG. 1) for designing a semiconductor package according to some embodiments, may be stored.

As the respective modules 10 to 50 and the respective libraries 61 to 63, which are stored in the storage 240, for example, are loaded in the main memory 300 and are processed by the central processing unit 200, the final layout FL, which is the final product of the system (for example, 1 in FIG. 1) for designing a semiconductor package, can be selected.

Hereinafter, referring to FIG. 15, such an operation will be described in more detail.

Referring to FIG. 15, the virtual stacking module 10, the first chip library 61, the second chip library 62 and the package substrate library 63, which are stored in the storage 240, are first loaded in the main memory 300 to be processed by the central processing unit 200 in S96. Then, the central processing unit 200 generates the plurality of virtual layouts L1 to Ln, to which the first and second chips are stacked, on the package substrate by performing procedures implemented in the virtual stack module 10 with inputs of the layout parameter for the first chip included in the first chip library 61, the layout parameter for the second chip included in the second chip library 62, and the layout parameter for the package substrate included in the package substrate library 63 in S100. The plurality of virtual layouts L1 to Ln generated as above are transferred from the main memory 300 to the storage 240 to be stored in the storage 240 in S104.

Next, the plurality of generated virtual layouts L1 to Ln and the chip modeling module 20 are loaded in the main memory 300 to be processed by the central processing unit 200 in S106. Then, the central processing unit 200 performs modeling of operating parameters CM1 to CMn of the first and second chips included in the respective generated virtual layouts L1 to Ln by performing procedures implemented in the chip modeling module 20 with inputs of the virtual layouts L1 to Ln in S110. The operating parameters CM1 to CMn of the first and second chips included in the generated virtual layouts L1 to Ln are transferred from the main memory 300 to the storage 240 to be stored in the storage 240 in S114.

Next, the plurality of generated virtual layouts L1 to Ln and the package modeling module 30 are loaded in the main memory 300 to be processed by the central processing unit 200 in S116. Then, the central processing unit 200 performs modeling of operating parameters PM1 to PMn of the package substrate included in the respective generated virtual layouts L1 to Ln by performing procedures implemented in the package modeling module 30 with inputs of the virtual layouts L1 to Ln in S120. The operating parameters PM1 to PMn of the package substrate included in the generated virtual layouts L1 to Ln are transferred from the main memory 300 to the storage 240 to be stored in the storage 240 in S124.

Next, the operating parameters CM1 to CMn of the first and second chips included in the respective virtual layouts L1 to Ln, the operating parameters PM1 to PMn of the package substrate included in the respective virtual layouts L1 to Ln, and the characteristic analyzing module 40 are loaded in the main memory 300 to be processed by the central processing unit 200 in S126. Then, the central processing unit 200 analyzes the operating characteristics of the respective generated virtual layouts L1 to Ln by performing procedures implemented in the characteristic analyzing module 40 with inputs of the operating parameters CM1 to CMn of the first and second chips and the operating parameters PM1 to PMn of the package substrate in S130. The operating characteristics OC1 to OCn of the respective virtual layouts L1 to Ln generated as the result of the analysis are transferred from the main memory 300 to the storage 240 to be stored in the storage 240 in S134.

Next, the plurality of generated virtual layouts L1 to Ln, the operating characteristics OC1 to OCn of the respective virtual layouts L1 to Ln, and the reviewing module 50 are loaded in the main memory 300 to be processed by the central processing unit 200 in S136. Then, the central processing unit 200 selects the virtual layout having the most superior operating characteristic among the virtual layouts L1 to Ln as the final layout FL by performing procedures implemented in the reviewing module 50 with inputs of the plurality of generated virtual layouts L1 to Ln and the operating characteristics OC1 to OCn of the respective virtual layouts L1 to Ln in S140. The final layout FL generated as the result of selection is transferred from the main memory 300 to the storage 240 to be stored in the storage 240 in S144.

The final layout FL stored in the storage 240 as described above may be used to fabricate the semiconductor package using the first chip included in the first chip library 61, the second chip included in the second chip library 62, and the package substrate included in the package substrate library 63.

Figure 16:
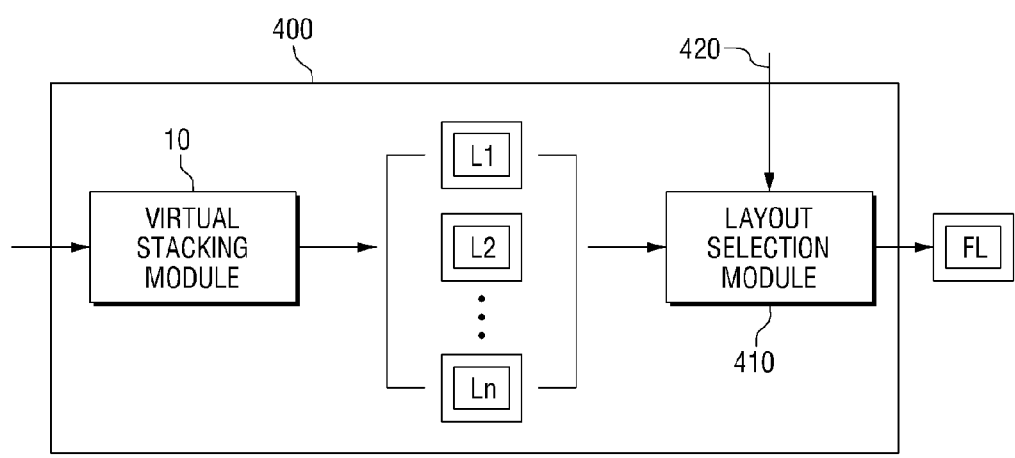
FIG. 16 is a block diagram of a system for designing a semiconductor package according to another embodiment of the present disclosure.

FIG. 16 is a block diagram of a system for designing a semiconductor package according to another embodiment of the present inventive concept. In this embodiment, a system 400 includes the virtual stacking module 10 and a layout selection module 410. The virtual stacking module 10 is again configured to generate multiple layouts L1 to Ln.

The layout selection module 410 is configured to select a layout of the layouts L1 to Ln as the final layout FL in response to characteristics 420. The selection may be made in response to a variety of characteristics. For example, the layout may be selected in response to design requirements, design margins, operating characteristics, packaging costs, parts and material availability, customer requirements, or the like. For example, a first desired semiconductor package with a set of chips may have first characteristics including a higher performance design. A second desired semiconductor package with the same set of chips may have second characteristics including, for example, a lower cost target, lower performance target, or other different characteristics.

The layout selection module 410 may be configured to select a first layout in response to first characteristics and a second, potentially different layout in response to the second characteristics. Although the layout selection module 410 has been described as selecting two layouts, the layout selection module 410 may be configured to select only one layout in response to selected characteristics 420. However, the layout selection module 410 is still capable of selecting a second layout in response to other characteristics. That is, in one operation, the layout selection module 410 may select the first layout in response to first characteristics 420 and in a second, different operation, select the second layout in response to the second characteristics 420. In other embodiments, the layout selection module 410 may be configured to select multiple layouts in response to multiple sets of characteristics 420.

The system 400 may be used similar to the system 1 described above. For example, the system 400 may be used to generate a final layout FL, used in the apparatus 100 as described above, or the like.

An embodiment includes a system for designing a semiconductor package using a computing system, comprising: a virtual stacking module configured to receive layout parameters for a plurality of chips, and a layout parameter for a package substrate, and in response to the layout parameters of the chips and the package substrate, generate a plurality of virtual layouts in which the chips are stacked, on the package substrate; and a layout selection module configured to select one of the virtual layouts in response to a set of characteristics.

In an embodiment, the layout selection module includes a modeling module configured to model operating parameters for the chips and the package substrate in response to the virtual layouts.

In an embodiment, the layout selection module includes a characteristic analyzing module configured to analyze operating characteristics of the virtual layouts in response to the modeled operating parameters.

An embodiment may include system for designing a semiconductor package, which can design a 3D semiconductor package at low cost using a computing system.

Another embodiment may include a method for designing a semiconductor package, which can design a 3D semiconductor package at low cost using a computing system.

Another embodiment may include a computing system that adopts the system for designing a semiconductor package.

Another embodiment may include a semiconductor package that is designed using the method for designing the semiconductor package.

Another embodiment may include an apparatus for fabricating a semiconductor package that includes the system for designing the semiconductor package.

Another embodiment may include a system for designing a semiconductor package using a computing system, comprising: a virtual stacking module receiving a layout parameter for a first chip, a layout parameter for a second chip that is different from the first chip, and a layout parameter for a package substrate, and based on this, generating virtual layouts, to which the first and second chips are stacked, on the package substrate; a modeling module modeling operating parameters for the first and second chips and the package substrate based on the generated virtual layouts; and a characteristic analyzing module analyzing operating characteristics of the generated virtual layouts based on the modeled operating parameters.

Another embodiment may include a method for designing a semiconductor package using a computing system, comprising: receiving a layout parameter for a first chip, a layout parameter for a second chip that is different from the first chip, and a layout parameter for a package substrate, and based on this, generating virtual layouts, to which the first and second chips are stacked, on the package substrate; modeling operating parameters for the first and second chips and the package substrate based on the generated virtual layouts; and analyzing operating characteristics of the generated virtual layouts based on the modeled operating parameters.

Another embodiment may include a computing system comprising: a central processing unit; and a storage storing therein a program for designing a layout of a semiconductor package, which includes a first chip, a second chip that is different from the first chip, and a package substrate, by an operation of the central processing unit, wherein the program includes; a virtual stacking module receiving a layout parameter for the first chip, a layout parameter for the second chip, and a layout parameter for the package substrate, and based on this, generating virtual layouts, to which the first and second chips are stacked, on the package substrate; a modeling module modeling operating parameters for the first and second chips and the package substrate based on the generated virtual layouts; a characteristic analyzing module analyzing operating characteristics of the generated virtual layouts based on the modeled operating parameters; and a reviewing module selecting any one of the plurality of generated virtual layouts based on the result of analysis.

Another embodiment may include a semiconductor package comprising: a package substrate; a first chip mounted on the package substrate according to a layout; and a second chip which is mounted on the package substrate according to the layout and is different from the first chip, wherein the layout is determined by; receiving a layout parameter for the first chip, a layout parameter for the second chip that is different from the first chip, and a layout parameter for the package substrate, and based on this, generating a plurality of virtual layouts, to which the first and second chips are stacked, on the package substrate; modeling a plurality of operating parameters for the first and second chips and the package substrate based on the respective generated virtual layouts; analyzing operating characteristics of the respective generated virtual layouts based on the respective modeled operating parameters; and selecting any one of the plurality of generated virtual layouts based on the result of analysis.

Another embodiment may include an apparatus for fabricating a semiconductor package, comprising: a semiconductor package fabricating system receiving a first chip, a second chip that is different from the first chip, and a package substrate, and mounting the first and second chips on the package substrate according to a layout; and a semiconductor package designing system providing the layout to the semiconductor package fabricating system, wherein the layout is determined by; receiving a layout parameter for the first chip, a layout parameter for the second chip that is different from the first chip, and a layout parameter for the package substrate, and based on this, generating a plurality of virtual layouts, to which the first and second chips are stacked, on the package substrate; modeling a plurality of operating parameters for the first and second chips and the package substrate based on the respective generated virtual layouts; analyzing operating characteristics of the respective generated virtual layouts based on the respective modeled operating parameters; and selecting any one of the plurality of generated virtual layouts based on the result of analysis Although embodiments of the present disclosure have been described for illustrative purposes, those skilled in the art will appreciate that various modifications, additions and substitutions are possible, without departing from the scope and spirit of the invention as disclosed in the accompanying claims.

What is claimed is:

1. A system for designing a semiconductor package, comprising:
a computing system configured to:
receive a layout parameter for a first chip, a layout parameter for a second chip that is different from the first chip, and a layout parameter for a package substrate, and in response to the layout parameters of the first chip, the second chip, and the package substrate, generate a plurality of virtual layouts;
after generating the virtual layouts, model operating parameters for the first and second chips and the package substrate in response to the respective virtual layouts; and
analyze operating characteristics of the virtual layouts in response to the modeled operating parameters,
wherein the first and second chip are stacked on the package substrate in the plurality of virtual layouts.

2. The system for designing a semiconductor package of claim 1, wherein:
the first chip includes a memory chip, and
the second chip includes a processor chip.

3. The system for designing a semiconductor package of claim 2, wherein:
the memory chip includes a DRAM chip, and
the processor chip includes an AP (Application Processor) chip.

4. The system for designing a semiconductor package of claim 1, wherein the layout parameters for the first and second chips and the layout parameter for the package substrate are provided in the form of a library.

5. The system for designing a semiconductor package of claim 4, wherein:
the layout parameters for the first and second chips include sizes of the first and second chips, an arrangement type of pads, a number of the pads, and a pitch between the pads, and
the layout parameter for the package substrate includes a size of the package substrate, an arrangement type of package balls, a number of the package balls, and a pitch between the package balls.

6. The system for designing a semiconductor package of claim 1, wherein connection relations among respective pads of the first chip, respective chip balls of the second chip, respective package balls of the package substrate, and respective joint balls connecting the first and second chips to the package substrate are defined by the virtual layouts.

7. The system for designing a semiconductor package of claim 1, wherein in at least one of the virtual layouts, the second chip is arranged on the package substrate, and the first chip is arranged on the second chip.

8. The system for designing a semiconductor package of claim 1, wherein the computing system is further configured to:
model the operating parameters for the first and second chips in response to the virtual layouts; and
model the operating parameters for the package substrate in response to the virtual layouts separate from the modelling of the operating parameters for the first and second chips.

9. The system for designing a semiconductor package of claim 1, wherein the operating parameters of the package substrate include an S-parameter model for the package substrate.

10. The system for designing a semiconductor package of claim 1, wherein the operating parameters include a signal parameter and a power parameter.

11. The system for designing a semiconductor package of claim 10, wherein the computing system is further configured to model the signal parameter of the package substrate on the basis of a length of a signal path of the package substrate based on the virtual layouts.

12. The system for designing a semiconductor package of claim 1, wherein the operating characteristics of the virtual layouts include signal integrity, power integrity, and temperature integrity of the generated virtual layouts.

13. The system for designing a semiconductor package of claim 1, wherein the computing system is further configured to select any one of the virtual layouts in response to the operating characteristics.

14. The system for designing a semiconductor package of claim 1, wherein the first chip includes two chips.

15. The system for designing a semiconductor package of claim 1, wherein the computing system is further configured to receive a layout parameter for another substrate and generate the virtual layouts in response to the layout parameter of the other substrate.

16. A computing system comprising:
a storage storing therein a program for designing a layout of a semiconductor package, which includes a first chip, a second chip that is different from the first chip, and a package substrate; and
a processor coupled to the storage and configured to operate in response to the program;
wherein the program includes:
a virtual stacking module configured to receive a layout parameter for the first chip, a layout parameter for the second chip, and a layout parameter for the package substrate, and in response to the layout parameters of the first chip, the second chip, and the package substrate, generate virtual layouts;
a modeling module configured to, after the generation of the virtual layouts, model operating parameters for the first and second chips and the package substrate in response to the respective virtual layouts;
a characteristic analyzing module configured to analyze operating characteristics of the virtual layouts in response to the modeled operating parameters; and
a reviewing module configured to select any one of the plurality of generated virtual layouts in response to the analyzed operating characteristics,
wherein the first and second chip configured to stack on the package substrate based on the virtual layouts.

17. The computing system of claim 16, wherein
the virtual stacking module is configured to receive the layout parameter for the first chip in a first chip library,
the virtual stacking module is configured to receive the layout parameter for the second chip in a second chip library,
the virtual stacking module is configured to receive the layout parameter for the package substrate in a package substrate library, and the first and second chip libraries and the package substrate library are stored in the storage.

18. The computing system of claim 16, further comprising a main memory configured to load the virtual stacking module, the modeling module, the characteristic analyzing module, and the reviewing module so that the central processing unit can perform procedures included in the virtual stacking module, the modeling module, the characteristic analyzing module, and the reviewing module.

19. A semiconductor package comprising:
a package substrate;
a first chip mounted on the package substrate according to a layout; and
a second chip which is mounted on the package substrate according to the layout and is different from the first chip,
wherein the layout is determined by:
receiving a layout parameter for the first chip, a layout parameter for the second chip that is different from the first chip, and a layout parameter for the package substrate, and in response to the layout parameters of the first chip, the second chip, and the package substrate, generating a plurality of virtual layouts;
after generating the virtual layouts, modeling a plurality of operating parameters for the first and second chips and the package substrate in response to the respective virtual layouts;
analyzing operating characteristics of the respective virtual layouts in response to the respective modeled operating parameters; and
selecting any one of the virtual layouts in response to the analyzed operating characteristics,
wherein the first and second chip configured to stack on the package substrate based on the plurality of virtual layouts.

20. The semiconductor package of claim 19, wherein:
the first chip includes a memory chip, and
the second chip includes a processor chip.

21. The semiconductor package of claim 20, wherein:
the memory chip includes a DRAM chip, and
the processor chip includes an AP (Application Processor) chip.

22. The semiconductor package of claim 19, further comprising joint balls electrically connecting at least one of the first chip and the second chip to the package substrate,
wherein the joint balls are arranged according to the layout.

23. The semiconductor package of claim 19, further comprising TSVs (Through Silicon Vias) electrically connecting at least one of the first chip and the second chip to the package substrate,
wherein the TSVs are arranged according to the layout.

24. The semiconductor package of claim 19, wherein the semiconductor package comprises an SIP (System In Package).

25. The semiconductor package of claim 24, wherein the SIP is implemented in at least one form of PoP (Package on Package), MCP (Multi-Chip Package), SSMCP (Side-by-Side Multi-Chip Package), and PiP (Package in Package).

26. An apparatus for fabricating a semiconductor package, comprising:
a semiconductor package fabricating system receiving a first chip, a second chip that is different from the first chip, and a package substrate, and mounting the first and second chips on the package substrate according to a layout; and
a semiconductor package designing system providing the layout to the semiconductor package fabricating system,
wherein the semiconductor package designing system is configured to determine the layout by:
receiving a layout parameter for the first chip, a layout parameter for the second chip, and a layout parameter for the package substrate, and in response to this, generating a plurality of virtual layouts;
after generating the virtual layouts, modeling a plurality of operating parameters for the first and second chips and the package substrate in response to the respective virtual layouts;
analyzing operating characteristics of the respective virtual layouts in response to the respective modeled operating parameters; and
selecting any one of the virtual layouts in response to the analyzed operating characteristics,
wherein the first and second chip configured to stack on the package substrate based on the plurality of virtual layouts.

27. The apparatus for fabricating a semiconductor package of claim 26, wherein the semiconductor package designing system is embedded in the apparatus for fabricating a semiconductor package.

28. A system for designing a semiconductor package, comprising:
a computing system configured to:
generate a plurality of layouts in response to layout parameters of a plurality of chips and a package substrate;
after generating the layouts, generate modeled operating parameters in response to the respective layouts; and
generate operating characteristics of the layouts in response to the modeled operating parameters,
wherein the plurality of chips comprises a first chip and a second chip that is different from the first chip, and the first chip and the second chip are staked on the package substrate in each of the layouts.

29. The system of claim 28, wherein the computing system is further configured to select one of the layouts in response to selection characteristics and the modeled operating parameters.

* * * * *